June 25, 1929.  O. A. HOKANSON ET AL  1,718,426

CLUTCH

Filed July 25, 1927

Patented June 25, 1929.

1,718,426

UNITED STATES PATENT OFFICE.

OTTO A. HOKANSON AND JAMES F. KOCA, OF WOODSTOCK, ILLINOIS.

CLUTCH.

Application filed July 25, 1927. Serial No. 208,348.

This invention relates to a clutch for transmitting movement from one part to another and has for its object the provision of clutching mechanism which will hold the driven part in locked position except when positively actuated but which will automatically release the driven part when the driver is actuated.

A further object is to provide a device of the class named which shall be of improved construction and operation. Other objects and advantages will appear from the following description.

The invention is exemplified in the combination and arrangement of parts shown in the accompanying drawing and described in the following specification, and it is more particularly pointed out in the appended claims.

In the drawing:—

Figure 1:
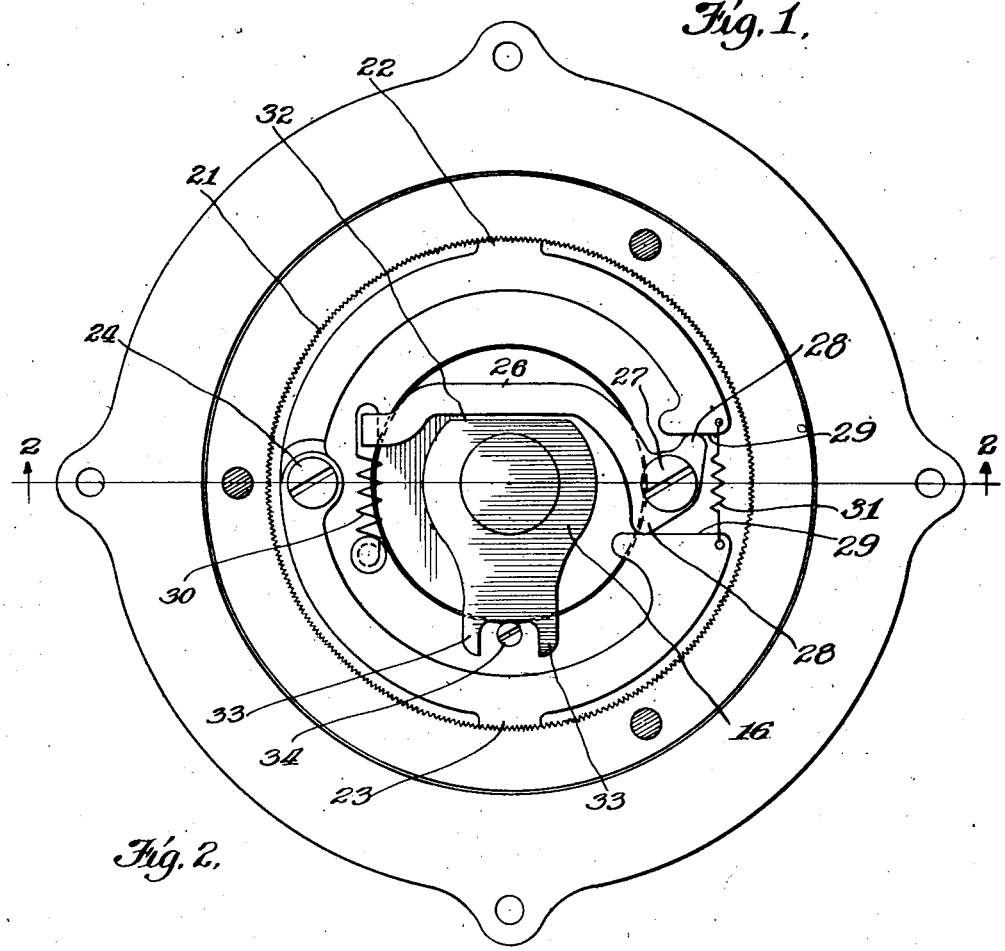
Fig. 1 is an elevation of one form of clutching mechanism embodying the present invention, the cover plate being removed.
Figure 2:
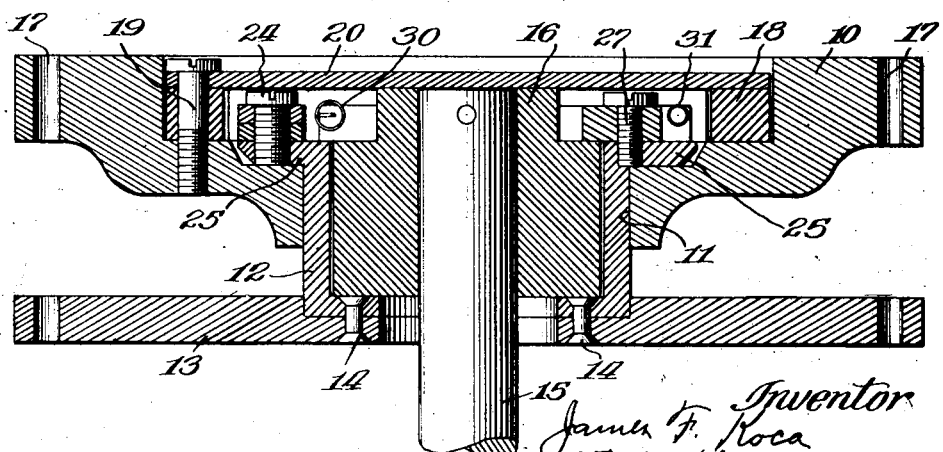
Fig. 2 is a section on line 2—2 of Fig. 1.

It will be understood that the invention is applicable to a great variety of devices and that many changes may be made in the details of construction without departing from the spirit and scope of the invention.

In the embodiment illustrated, the numeral 10 designates a housing having a central opening 11 in which a sleeve 12 is journaled. A driven member 13 is attached to the sleeve 12 by rivets 14. It will be understood that this member may be a driven part of any device which is held rigidly against rotation by force applied to the member itself but which will be readily rotated by force applied to a driver.

15 designates the driving member having a block 16 fixed thereto and journaled in the sleeve 12. The housing 10 may be attached to any support by fasteners which may be extended through openings 17. A ring 18 is secured within the housing 10 by means of cap screws 19 which screws also hold a cover plate 20 in place. The inner surface of the ring is provided with serrations or teeth 21 for engagement with toothed jaws 22 carried by arms 23 which are pivotally mounted at 24 on a radially extending flange 25 on the sleeve 12. A lever 26 is pivoted at 27 on the flange 25 and is provided with cam lugs 28 which engage contact faces 29 on the ends of the arms 23 to press the arms outwardly, holding the jaws 22 in engagement with the teeth 21. A spring 30 draws the arm 26 inwardly, forcing the cam lugs 28 into contact with the faces 29. A spring 31 connects the ends of the arms 23 to draw the arms together when released by the cam lugs 28 and thus disengage the jaws 22 from the teeth 21. The block 16 is provided with a flat face 32 disposed adjacent the arm 26 so that when the driver 15 is rotated, the face 32 will act as a cam to force the lever 26 outwardly, thus releasing the cam lugs 28 and the jaws 22.

Rotation of the block 16 relative to the sleeve 12 is limited by spaced stops 33 on the block 16 arranged to engage a pin 34 on the flange 25.

When the parts are in their normal inactive position, as shown in the drawing, it will be apparent that the sleeve 12, and consequently the driven member 13, will be rigidly held against rotation relative to the fixed member 10. If the driver 15, however, is rotated in either direction, the first effect will be to swing the lever 26 against the spring 30, thus releasing the ends of the arms 23 so that the spring 31 will withdraw the jaws 22 from the contact teeth 21 of the stop ring 18. The initial rotation of the driver 15 will also bring one or the other of the stops 33, depending on the direction of rotation, into engagement with the pin 34 so that further rotation of the driver will be transmitted through the pin 34, flange 25, and sleeve 12 to the driven member 13. The driven member 13 may be turned any desired amount, and, upon release of the driver 15, the spring 30 will draw the levers 26 inwardly and force the arms 23 outwardly to bring the jaws 22 into mesh with the teeth 21 and thus lock the driven member 13 against rotation in either direction.

We claim:—

1. Clutching mechanism comprising a fixed stop member, a driven member, a detent connected with said driven member for engaging said fixed stop member to hold said driven member against movement, a driver, and means operated by said driver upon initial movement thereof for releasing said detent, said driver being arranged to move said driven member on further operation of said driver after the release of said detent.

2. Clutching mechanism comprising a fixed stop member, a driven member, a detent connected with said driven member for engaging said fixed stop member to hold said driven member from rotation, a driver, and means for releasing said detent upon rotation of said driver in either direction.

3. Clutching mechanism comprising a stop member, a driven member, a pair of clutch jaws pivotally mounted on said driven member in position to engage said stop member, means for holding said clutch jaws in engagement with said stop member, a driver for said driven member having lost motion connection therewith, and means connected with said driver for releasing said jaws upon initial movement of said driver.

4. Clutching mechanism comprising a circular stop member having teeth therein, a driven member, a jaw pivotally mounted on said driven member and having teeth thereon for engaging the teeth on said stop member, means for holding said jaw in operative engagement with said teeth, a driver, and means operated by said driver on initial rotation thereof in either direction for releasing said jaw, said driver being arranged to rotate said driven member on further rotation thereof after the release of said jaw.

5. Clutching mechanism comprising a housing member, a circular stop rack having internal teeth disposed in said housing member, a driven member extending into said housing member, a jaw pivoted on said driven member and having teeth thereon for engaging the teeth of said stop rack, a driver extending into said housing member and having lost motion connection with said driven member, means on said driver for releasing said jaw from said stop rack on initial movement of said driver, and means for restoring said jaw into engagement with said stop rack when said driver comes to rest.

6. Clutching mechanism comprising a housing member, a driven member, means fixed to said driven member and extending into said housing member, a jaw pivotally mounted on said last-named means, a cam lever for holding said jaw in engagement with said housing member for preventing rotation of said driven member, a driver, means on said driver for operating said cam lever to release said jaw, a spring for disengaging said jaw from said housing member when released by said cam lever, and means for limiting rotation of said driver relative to said driven member to cause said driver to rotate said driven member after initial rotation of said driver for releasing said cam lever.

7. Clutching mechanism comprising a circular fixed stop member, a driven member, a pair of jaws pivotally connected with said driven member and disposed adjacent said stop member, a cam lever engaging the ends of said jaws, a spring for operating said cam lever to force said jaws apart into engagement with said circular stop member, a driver having a cam face thereon for moving said cam lever against the force of its spring to release said jaws, a spring for retracting said jaws from said stop member when released by said cam lever, and means for limiting the rotation of said driver relative to said driven member to cause said driver to rotate said driven member subsequent to initial rotation of said driver.

8. Clutching mechanism comprising a housing, a sleeve journaled in said housing, a driven member attached to said sleeve outside of said housing, a shaft journaled in said sleeve, interlocking mechanism between said sleeve and housing for normally holding said sleeve against rotation in said housing, and means on said shaft for releasing said interlocking mechanism to permit said driven member to be rotated by said shaft.

9. Clutching mechanism comprising a housing, a sleeve journaled in said housing, a driven member connected with said sleeve, a stop ring attached to said housing, a pair of clutch jaws pivotally connected with said sleeve for engaging said stop ring, means for releasing said clutch jaws, a driver journaled in said sleeve, means actuated upon initial rotation of said driver for releasing said clutch jaws, and means for limiting relative rotation of said driver and driven member.

10. Clutching mechanism comprising a housing, a stop ring having internal teeth thereon secured in said housing, a sleeve journaled in said housing having a radially extending flange thereon, a pair of outwardly curved clutch jaws pivotally mounted on said flange, a cam lever having cam lugs thereon interposed between the ends of said clutch jaws, a spring for actuating said cam lever to force said clutch jaws outwardly into contact with said stop ring, a spring for moving said clutch jaws inwardly when released by said cam lever, a driver journaled in said sleeve, means for limiting the rotation of said driver relative to said driven member, and a cam on said driver for moving said cam lever to release said clutch jaws on initial rotation of said driver relative to said driven member.

11. A clutch having a rotatable driver, a rotatable driven member, means for holding said driven member in any position of adjustment to which it is turned, and means operated by said driver upon rotation thereof in either direction to release said holding means.

In testimony whereof we have signed our names to this specification on this 20th day of July, A. D. 1927.

JAMES F. KOCA.
OTTO A. HOKANSON.